US011343317B2

(12) United States Patent
Yu et al.

(10) Patent No.: US 11,343,317 B2
(45) Date of Patent: May 24, 2022

(54) DATA TRANSMISSION METHOD AND DEVICE (71) Applicants: Siemens Aktiengesellschaft, Munich (DE); He Yu, Wuxi (CN); Yong Yuan, Beijing (CN); Hai Tao Zhang, Beijing (CN)

(72) Inventors: He Yu, Wuxi (CN); Yong Yuan, Beijing (CN); Hai Tao Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 44 days.

(21) Appl. No.: 16/615,683

(22) PCT Filed: May 26, 2017

(86) PCT No.: PCT/CN2017/086206
§ 371 (c)(1),
(2) Date: Nov. 21, 2019

(87) PCT Pub. No.: WO2018/214168
PCT Pub. Date: Nov. 29, 2018

(65) Prior Publication Data
US 2020/0128077 A1 Apr. 23, 2020

(51) Int. Cl.
*H04L 67/12* (2022.01)
*H04L 69/18* (2022.01)

(52) U.S. Cl.
CPC .............. *H04L 67/12* (2013.01); *H04L 69/18* (2013.01); *H04L 2212/00* (2013.01)

(58) Field of Classification Search
CPC ..... H04L 67/12; H04L 69/18; H04L 2212/00; G06F 13/387; G06F 11/2087; G06F 13/4045; G06F 16/9017
See application file for complete search history.

(56) References Cited

U.S. PATENT DOCUMENTS 7,194,550 B1   3/2007   Chamdani et al.
10,405,150 B2*  9/2019   Aiuto ...................... H04W 4/80
(Continued)

FOREIGN PATENT DOCUMENTS

CN    101582895 A    11/2009
CN    101741819 A    6/2010
(Continued)

OTHER PUBLICATIONS

International Search Report PCT/ISA/210 for International Application No. PCT/CN2017/086206 filed May 26, 2017.
(Continued)

*Primary Examiner* — Chandrahas B Patel
(74) *Attorney, Agent, or Firm* — Harness, Dickey & Pierce, P.L.C.

(57) ABSTRACT

Embodiments provide a data transmission method and apparatus. The method includes: after obtaining information of a target input port of a data receiving device and information of a target protocol used by a target Internet of Things device connected to the target input port, the data receiving device determines the target input port and the target protocol, and decapsulates, according to the target protocol, a first data packet transmitted by the target Internet of Things device via means of the target input port to obtain data. The data receiving device can adaptively determine a target protocol according to the information of the target protocol used by the target Internet of Things device, without configuring the target protocol for the target Internet of Things device in advance.

13 Claims, 4 Drawing Sheets (56) References Cited

U.S. PATENT DOCUMENTS

| | | | |
|---|---|---|---|
| 10,447,665 B2* | 10/2019 | Kudaraya | H04L 63/126 |
| 10,567,310 B2* | 2/2020 | Sharma | H04L 47/283 |
| 10,756,924 B2* | 8/2020 | Sarabia | H04L 12/40 |
| 10,861,002 B2* | 12/2020 | Britt | G06Q 20/3224 |
| 2006/0067209 A1 | 3/2006 | Clementi et al. | |
| 2015/0063368 A1 | 3/2015 | Sharma et al. | |
| 2015/0081922 A1 | 3/2015 | Brett | |
| 2017/0012853 A1 | 1/2017 | Bermudez et al. | |
| 2017/0093884 A1 | 3/2017 | Al Abdulhadi et al. | |

FOREIGN PATENT DOCUMENTS

| | | |
|---|---|---|
| CN | 102059256 A | 5/2011 |
| CN | 104345717 A | 2/2015 |
| CN | 108533886 A | 3/2017 |

OTHER PUBLICATIONS

Written Opinion of the International Searching Authority PCT/ISA/237 for International Application No. PCT/CN2017/086206 filed May 26, 2017.
Wu et al. "Application of Multiplex Protocol Gateway on Upgrading PLC System", 31.8, Aug. 31, 2018.
Bai et al. "Development and Application of Ethernet Modbus Protocol Conversion Module", 30.9, Sep. 30, 2009.
Extended European Search Report dated Aug. 6, 2020.
Chinese Office Action dated Apr. 30, 2021 issued in corresponding Chinese Patent Application No. 201780089064.5.

* cited by examiner

DATA TRANSMISSION METHOD AND DEVICE

PRIORITY STATEMENT

This application is the national phase under 35 U.S.C. § 371 of PCT International Application No. PCT/CN2017/086206, which has an International filing date of May 26, 2017, which designated the United States of America and which claims priority to Chinese Patent Application No. CN 201710378198.0 filed May 25, 2017, the entire contents of which are hereby incorporated herein by reference.

FIELD

Embodiments of the application generally relate to the technical field of communication, and in particular relate to a data transmission method and device.

BACKGROUND

With the development of communication technologies, the Internet of things (IoT) has currently become the trend of a new generation of information technology. The IoT can utilize various communication technologies to connect sensors, controllers and devices together to form interconnections between things, thus realizing a remotely managed and controlled intelligent information network.

In the IoT, for example, the industrial IoT (IIoT), different manufacturers and different types of IoT devices will cause differences in data transmission in the IoT, that is to say, a plurality of data transmission protocols are used in the IoT to realize data transmission. Therefore, the middleware devices responsible for continuous data gathering and the serving devices responsible for data analysis and processing in the IoT can be connected to the IoT devices using a plurality of protocols for communication, and the protocols can be the transmission control protocol (TCP)/the Internet protocol (IP), the object linking and embedding (OLE) for process control (OPC) protocol, OPC unified architecture (OPCUA) protocol, S7 protocol and Modbus protocol. Thus, the middleware devices or serving devices as data receiving devices need to maintain a plurality of protocols and use the corresponding protocol to receive corresponding protocol data packets.

Because of the close coupling between the traditional control layer and data layer, data receiving devices in the IoT need to maintain each corresponding protocol used by the IoT devices so as to receive data. Therefore, during the deployment, scaling or maintenance of the IoT, data receiving devices all need to adaptively adjust the maintained protocols according to the protocols used by the connected IoT devices. As a result, protocols cannot be used flexibly, and the complexity of maintaining a plurality of protocols is increased.

SUMMARY

In view of this, the embodiments of the present application provide a data transmission method and device to improve upon or even solve the problem with the low protocol application flexibility in the prior art.

In a first aspect, embodiments of the present invention provide a data transmission method, and the method comprises:

a data receiving device acquiring the information about the target protocol adopted by the target IoT device connected to a target input port, the target input port being one input port of the data receiving device, the data receiving device determining the corresponding target protocol in a plurality of protocols according to the information about the target protocol, and the data receiving device decapsulating the first data packet received through the target input port according to the target protocol to obtain data, the first data packet being sent by the target IoT device.

In a second aspect, embodiments of the present invention further provide a data receiving device, and the device comprises:

a data acquisition module, used to acquire the information about the target protocol adopted by the target IoT device connected to a target input port, the target input port being one input port of the data receiving device, a processing module, used to determine the corresponding target protocol in a plurality of protocols according to the information acquired by the acquisition module about the target protocol, and a communication module, used to receive a first data packet through the target input port, the first data packet being sent by the target IoT device, the processing module being further used to decapsulate the first data packet received by the communication module according to the target protocol to obtain data.

In a third aspect, embodiments of the present invention further provide a data receiving device, and the device comprises:

at least one memory, used to store computer programs, and at least one port, used to send and receive data, and at least one processor, used to invoke the computer program stored in the at least one memory to execute the method provided by the first aspect or any possible implementation mode in the first aspect based on the function of the at least one port sending and receiving data.

In a fourth aspect, embodiments of the present invention further provide a computer-readable medium. Computer instructions are stored in the computer-readable medium. When the computer instructions are invoked by a processor, the processor executes the method provided by an embodiment of the first aspect or any possible implementation mode in the first aspect.

DESCRIPTION OF REFERENCE NUMERALS IN THE DRAWINGS

101: Data receiving device
102: IoT device
103: Serving device
201: Acquire the information about the target protocol
202: Determine the target protocol
203: Decapsulate the first data packet 301: Acquisition module
302: Processing module
303: Communication module
401: At least one memory
402: At least one processor
403: At least one port
404: Bus

DETAILED DESCRIPTION OF THE EXAMPLE EMBODIMENTS

In a first aspect, embodiments of the present invention provide a data transmission method, and the method comprises:

a data receiving device acquiring the information about the target protocol adopted by the target IoT device connected to a target input port, the target input port being one input port of the data receiving device, the data receiving device determining the corresponding target protocol in a plurality of protocols according to the information about the target protocol, and the data receiving device decapsulating the first data packet received through the target input port according to the target protocol to obtain data, the first data packet being sent by the target IoT device.

Through the above-mentioned method, the data receiving device can adaptively determine the target protocol according to the information about the target protocol adopted by the target IoT device, without configuring the target protocol for the target IoT device in advance. Therefore, the solution can improve the protocol application flexibility in the data receiving device, and thus can lower the complexity of the data receiving device maintaining a plurality of protocols.

Alternatively, the data receiving device acquiring the information about the target protocol adopted by the target IoT device connected to the target input port comprises:

the data receiving device acquiring a connection model, wherein the connection model contains the information about the protocol adopted by the IoT device connected to each input port of the data receiving device, and the data receiving device acquiring from the connection model the information about the target protocol adopted by the target IoT device connected to the target input port.

Through the above-mentioned method, the data receiving device can accurately acquire the information about the target protocol adopted by the target IoT device connected to the target input port.

Alternatively, the data receiving device determining the corresponding target protocol in a plurality of protocols according to the information about the target protocol comprises:

the data receiving device determining the target protocol model in the preset protocol models of the plurality of protocols according to the information about the target protocol, wherein the protocol model of any protocol is the template generating the protocol, and the data receiving device instantiating the target protocol model to obtain the target protocol.

Through the above-mentioned method, the data receiving device can adaptively determine the target protocol by presetting the protocol models of a plurality of protocols, without configuring the target protocol for the target IoT device in advance. Therefore, the solution can improve the protocol application flexibility in the data receiving device, and thus can lower the complexity of the data receiving device maintaining a plurality of protocols.

Alternatively, after the data receiving device obtains the data, the method further comprises:

the data receiving device encapsulating the data according to the protocol used by the serving device to obtain a second data packet, and the data receiving device sending the second data packet to the serving device.

Through the above-mentioned method, the data receiving device can send the data obtained from decapsulation to the serving device.

Alternatively, the target protocol is any of TCP/IP, OPC protocol, OPCUA protocol, S7 protocol and Modbus protocol.

In a second aspect, embodiments of the present invention further provide a data receiving device, and the device comprises:

a data acquisition module, used to acquire the information about the target protocol adopted by the target IoT device connected to a target input port, the target input port being one input port of the data receiving device, a processing module, used to determine the corresponding target protocol in a plurality of protocols according to the information acquired by the acquisition module about the target protocol, and a communication module, used to receive a first data packet through the target input port, the first data packet being sent by the target IoT device, the processing module being further used to decapsulate the first data packet received by the communication module according to the target protocol to obtain data.

In this way, the data receiving device can adaptively determine the target protocol according to the information about the target protocol adopted by the target IoT device, without configuring the target protocol for the target IoT device in advance. Therefore, the solution can improve the protocol application flexibility in the data receiving device, and thus can lower the complexity of the data receiving device maintaining a plurality of protocols.

Alternatively, the acquisition module is particularly used to:

acquire a connection model, wherein the connection model contains the information about the protocol adopted by the IoT device connected to each input port of the data receiving device, and acquire from the connection model the information about the target protocol adopted by the target IoT device connected to the target input port.

In this way, the data receiving device can accurately acquire the information about the target protocol adopted by the target IoT device connected to the target input port.

Alternatively, when determining the corresponding target protocol in a plurality of protocols according to the information about the target protocol, the processing module is particularly used to:

determine the target protocol model in the preset protocol models of the plurality of protocols according to the information about the target protocol, wherein the protocol model of any protocol is the template generating the protocol, and instantiate the target protocol model to obtain the target protocol.

In this way, the data receiving device can adaptively determine the target protocol by presetting the protocol models of a plurality of protocols, without configuring the target protocol for the target IoT device in advance. Therefore, the solution can improve the protocol application flexibility in the data receiving device, and thus can lower the complexity of the data receiving device maintaining a plurality of protocols.

Alternatively, the processing module is further used to encapsulate data according to the protocol used by the serving device to obtain a second data packet after obtaining the data, and the communication module is further used to send the second data packet obtained by the processing module to the serving device.

In this way, the data receiving device can send the data obtained from decapsulation to the serving device.

Alternatively, the target protocol is any of TCP/IP, OPC protocol, OPCUA protocol, S7 protocol and Modbus protocol.

In a third aspect, embodiments of the present invention further provide a data receiving device, and the device comprises:

at least one memory, used to store computer programs, and at least one port, used to send and receive data, and at least one processor, used to invoke the computer program stored in the at least one memory to execute the method provided by the first aspect or any possible implementation mode in the first aspect based on the function of the at least one port sending and receiving data.

In a fourth aspect, embodiments of the present invention further provide a computer-readable medium. Computer instructions are stored in the computer-readable medium. When the computer instructions are invoked by a processor, the processor executes the method provided by an embodiment of the first aspect or any possible implementation mode in the first aspect.

In the technical solution provided by the embodiments of the present invention, after acquiring the information about the protocol adopted by the target IoT device connected to the target input port, the data receiving device determines the target protocol and decapsulates the first data packet sent by the target IoT device through the target input port according to the target protocol to obtain data. In the solution, the data receiving device can adaptively determine the target protocol according to the information about the target protocol adopted by the target IoT device, without configuring the target protocol for the target IoT device in advance. Therefore, the solution can improve the protocol application flexibility in the data receiving device, and thus can lower the complexity of the data receiving device maintaining a plurality of protocols.

To make clearer the object, technical solution and advantages of the present invention, the embodiments of the present invention are described in detail below in combination with the drawings. The embodiments described later are only a part, but not all of the embodiments of the present invention.

The embodiments of the present invention provide a data transmission method and device to solve the problem with the low protocol application flexibility in the prior art.

Wherein, since the method and the device use the similar principle to solve the problem, the implementation modes of the device and the method can be cross-referenced and repetitions are not described again.

In the embodiments of the present invention, after acquiring the information about the protocol adopted by the target IoT device connected to the target input port, the data receiving device determines the target protocol and decapsulates the first data packet sent by the target IoT device through the target input port according to the target protocol to obtain data. In the solution, the data receiving device can adaptively determine the target protocol according to the information about the target protocol adopted by the target IoT device, without configuring the target protocol for the target IoT device in advance. Therefore, the solution can improve the protocol application flexibility in the data receiving device, and thus can lower the complexity of the data receiving device maintaining a plurality of protocols.

Some terms in the embodiments of the present invention are explained below to help those skilled in the art to understand.

1) IoT device, a device providing data connectivity or a device generating data in the IoT. In different scenarios, the IoT device is also different. For example, the IoT device may be a handheld device, onboard device, wearable device or computing device of traditional IoT devices. Again for example, the IoT device may be a sensor, thermometer or machine of IIoT devices.

Wherein, when the IoT device sends data to other devices in the IoT, it needs to adopt the corresponding protocol to encapsulate the data. Obviously, the protocols adopted by different IoT devices may be different.

2) Data receiving device, a device used to receive data from the IoT device in the IoT, for example, a data acquisition gateway, a converging device having the data convergence function or a server realizing the data service function. Alternatively, when the data receiving device is a data acquisition gateway or converging device which needs to upload the received data to an upper layer device (for example, a server), the data receiving device can be called middleware.

3) Protocol, a set of rules and conventions both communicating parties must observe. A protocol defines the format both communicating parties use to transmit data and the method both communicating parties use to process data. The sending party involved in communication needs to use a protocol to encapsulate the data to be sent into data packets to realize data transmission. Accordingly, after receiving the data packets, the receiving party involved in communication also needs to use the protocol to decapsulate the data packets to obtain the data sent by the sending party.

Currently, because of different manufacturers of IoT devices and different types of IoT devices, a plurality of different protocols, for example, TCP/IP, OPC protocol, OPCUA protocol, S7 protocol and Modbus protocol, are applied in the IoT.

4) Connection model, which can be deployed in a data receiving device. Wherein, the connection model contains the information about the protocol adopted by the IoT device connected to each input port of the data receiving device, that is to say, the connection model stipulates the correspondence between each input port and the information about the protocol adopted by the IoT device connected to the input port. Alternatively, the connection model also contains the device information (for example, ID and IP address of the device) about the IoT device connected to each input port, that is to say, the connection model also stipulates the correspondence between each input port and the device information about the IoT device connected to the input port.

Through the connection model, the data receiving device can determine the network topology of the current IoT, the protocol adopted by the IoT device which needs to send data to the data receiving device, and device information about the connected IoT device.

Alternatively, the connection model can be configured for the user according to the field network topology of the actual IoT and can be deployed into the data receiving device.

5) Protocol model, a template which generates the protocol and is stored in the data receiving device. The protocol model of a protocol is an abstraction of the method or rules adopted by the device adopting the protocol to process data. The data receiving device can instantiate the protocol model of a protocol to obtain a specific protocol. Alternatively, when protocol models and protocols are realized through software, the protocol models can be classified, and a specific protocol is an object.

To describe more clearly the technical solution in the embodiments of the present invention, the embodiments of the present invention are described in detail below in combination with the drawings.

Figure 1:
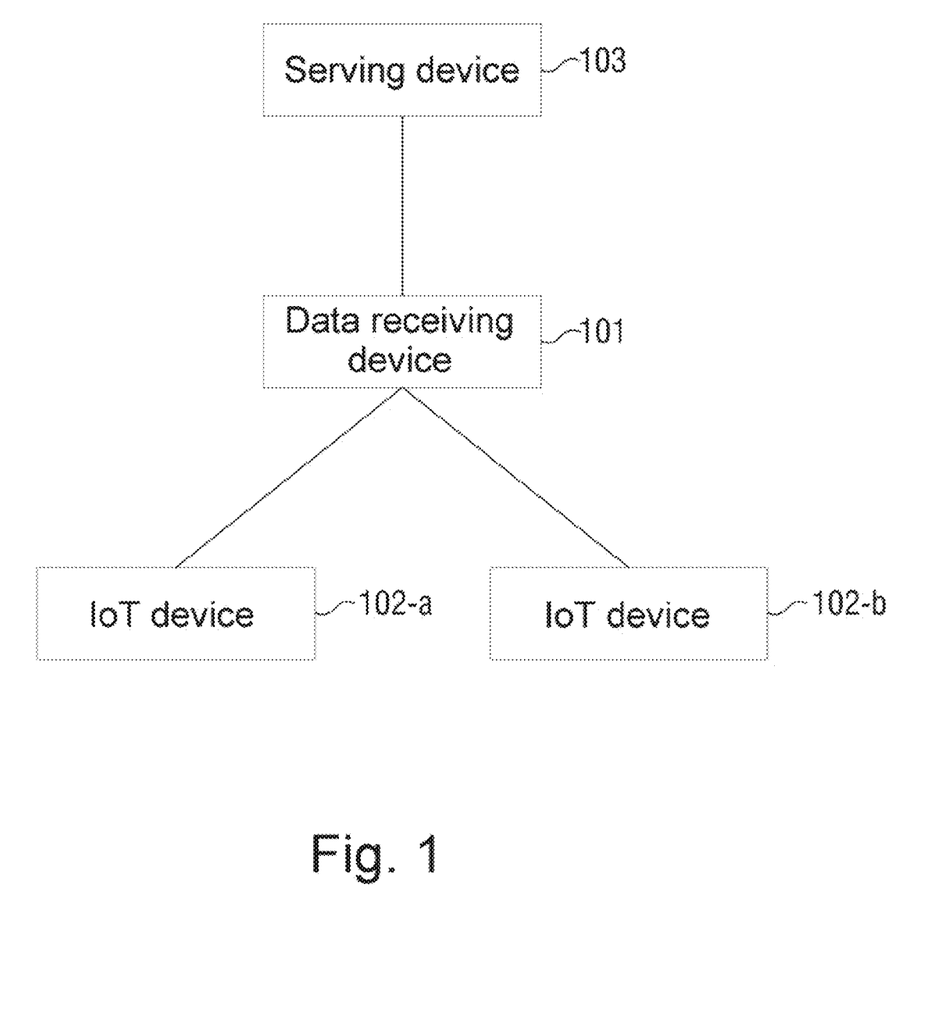
FIG. 1 shows the architecture of a data transmission system provided in the embodiments of the present invention.

FIG. 1 shows the architecture of a possible data transmission system in the embodiments of the present invention. The data transmission system comprises a data receiving device 101 and at least one IoT device 102 (IoT device 102-*a* and IoT device 102-*b* as shown in the figure).

Each IoT device 102 is used to generate or collect data and transmit the data to the data receiving device 101. Wherein, after generating or collecting the data to be sent, each IoT device 102 needs to use its own protocol to encapsulate the data into data packets to realize data transmission.

The data receiving device 101 is connected to at least one IoT device 102 in the data transmission system, receives data packets sent by each IoT device 102 and uses the corresponding protocol to decapsulate the received data packets to obtain the corresponding data. Wherein, the data receiving device 101 contains a plurality of input ports, each input port can be connected to one IoT device 102. In this way, the data receiving device 101 can receive data packets from an IoT device 102 through an input port.

Example 1

The IoT device 102-*a* adopting the S7 protocol is connected to input Port 1 of the data receiving device 101, and the IOT device 102-*b* adopting the OPC protocol is connected to input Port 2 of the data receiving device 101.

In the above-mentioned scenario, after having Data 1 to send, the IoT device 102-*a* uses the S7 protocol to encapsulate Data 1 to be sent into an S7 data packet and sends the S7 data packet to the data receiving device 101; after having Data 1 to send, the IoT device 102-*b* uses the OPC protocol to encapsulate the data to be sent into an OPC data packet and sends the OPC data packet to the data receiving device 101.

The data receiving device 101 receives the S7 data packet from the IoT device 102-*a* through Port 1 and uses the S7 protocol to decapsulate the S7 data packet to obtain Data 1 of the IoT device 102-*a*; the data receiving device 101 receives the OPC data packet from the IoT device 102-*b* through Port 2 and uses the OPC protocol to decapsulate the OPC data packet to obtain Data 2 of the IoT device 102-*b*.

Alternatively, the data transmission system further comprises a serving device 103. After obtaining data from an IoT device, the data receiving device 101 can also send the obtained data to the serving device 103. Of course, the data receiving device 101 also needs to determine the protocol adopted by the serving device 103, uses the determined protocol to encapsulate the obtained data into a data packet, and sends the encapsulated data packet to the serving device 103.

Again in example 1, if the data receiving device 101 determines that the serving device 103 adopts TCP/IP, after obtaining Data 1 and Data 2, the data receiving device 101 can use TCP/IP to encapsulate Data 1 and Data 2 into TCP/IP data packets and send the encapsulated TCP/IP data packets to the serving device 103.

Figure 2:
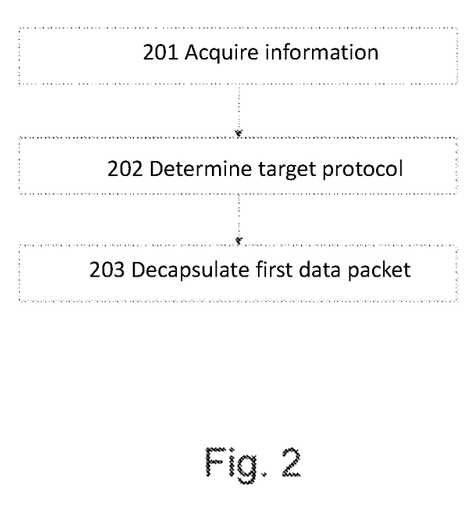
FIG. 2 is a flowchart of a data transmission method provided in the embodiments of the present invention.

As shown in FIG. 2, the embodiments of the present invention provide a data transmission method, the method is applicable to the data transmission system shown in FIG. 1, and the data receiving device 101 involved in the method can be the data receiving device 101 in the data transmission system. The process of the method executed by the data receiving device 101, for example, is described below. The method shown in FIG. 2 comprises the following steps:

Step 201: The data receiving device 101 acquires the information about the target protocol adopted by the target IoT device 102 connected to a target input port, and the target input port is one input port of the data receiving device 101.

Alternatively, the information about the target protocol is the ID, semantic descriptive information or other information which can uniquely represent the target protocol.

Alternatively, the data receiving device 101 can implement step 201 through the following implementation modes:

First implementation mode: The data receiving device 101 can obtain the information about the target protocol adopted by the target IoT device 102 connected to the target input port according to the instruction entered by the user.

Second implementation mode: The data receiving device 101 can obtain the information sent from the serving device 103 about the target protocol adopted by the target IoT device 102 connected to the target input port.

Third implementation mode: The data receiving device 101 acquires a connection model, wherein the connection model contains the information about the protocol adopted by the IoT device 102 connected to each input port of the data receiving device 101; the data receiving device 101 acquires from the connection model the information about the target protocol adopted by the IoT device 102 connected to the input port.

Since the connection model contains the information about the protocol adopted by the IoT device 102 connected to each input port of the data receiving device 101, the third implementation mode can be adopted when the data receiving device 101 acquires the information about the protocol adopted by the IoT device 102 connected to any input port of a plurality of input ports of the data receiving device.

It can be learned from the previous description of the connection model, the connection model can be configured for the user according to the field network topology of the actual IoT and can be deployed into the data receiving device 101. In addition, the connection model can contain not only the information about the protocol adopted by the IoT device 102 connected to each input port of the data receiving device 101, but also device information (for example, device ID and IP address) of the IoT device 102 connected to each input port, that is to say, the connection model also stipulates the correspondence between each input port and the device information about the IoT device 102 connected to the input port.

Therefore, in order to guarantee that the data receiving device 101 can accurately determine the protocol adopted by the IoT device 102 connected to each input port according to the connection model, the data receiving device 101 verifies the accuracy or feasibility of the connection model after the data receiving device 101 acquires the connection model but before the data receiving device executes step 201.

For example, the connection model stipulates that input Port 3 of the data receiving device 101 is connected to the IoT device 102 adopting the S7 protocol, the IP address of the IoT device 102 is XXX.XXX.XXXX. Then the data receiving device 101 can send a verification request whose destination address is XXX.XXX.XXXX and which is encapsulated by use of the S7 protocol through Port 3. If the data receiving device 101 receives a verification response returned by the IoT device 102, the verification succeeds, and otherwise, the verification fails.

Through the setting of the connection model, if the IoT is deployed again or the field network environment is changed, the IoT administrator does not need to adjust or configure the protocol to be used for each data receiving device 101 in the IoT and the data receiving device 101 can obtain the topology of the IoT and the protocol used by each connected IoT device 102. Therefore, the labor cost is reduced and the IoT deployment efficiency is improved.

Step 202: The data receiving device 101 determines the corresponding target protocol in a plurality of protocols according to the information about the target protocol.

Alternatively, the data receiving device 101 can perform step 202 through the following steps:

the data receiving device 101 determines the target protocol model in the preset protocol models of the plurality of protocols according to the information about the target protocol, wherein the protocol model of any protocol is the template generating the protocol, and the data receiving device 101 instantiates the target protocol model to obtain the target protocol.

Alternatively, when saving the protocol models of a plurality of protocols, the data receiving device 101 also saves the information about the corresponding protocol of each protocol model accordingly, that is to say, the data receiving device 101 saves the correspondences between a plurality of protocol models and the information about the protocols. In this way, the data receiving device 101 can accurately obtain the corresponding target protocol model of the information about the target protocol directly through the above-mentioned correspondences.

It can be learned from the previous description of the protocol model that the target protocol model is an abstraction of the method or rules adopted by the device adopting the target protocol to process data. Therefore, the data receiving device 101 needs to instantiate the target protocol model to obtain the target protocol.

Alternatively, the target protocol can be any of TCP/IP, OPC protocol, OPCUA protocol, S7 protocol and Modbus protocol.

Alternatively, the protocol models of a plurality of protocols, for example, TCP/IP model, OPC protocol model, OPCUA protocol model, S7 protocol model and Modbus protocol model, are stored in the data receiving device 101. In this way, the data receiving device 101 can still determine the protocol model of each protocol while acquiring the information about different protocols, and thus can obtain each protocol. The efficiency of the data receiving device 101 determining a specific protocol is improved.

In addition, a plurality of protocol models can be stored in the data receiving device 101 to help the data receiving device 101 to perform management operations such as add, modify or delete for the plurality of stored protocol models.

Step 203: The data receiving device 101 decapsulates the first data packet received through the target input port according to the target protocol to obtain data, wherein the first data packet is sent by the target IoT device 102.

Through step 203, the data receiving device can obtain the data sent by the target IoT device 102.

Alternatively, if the data receiving system further comprises the serving device 103, after step 203, the method further comprises:

the data receiving device 101 encapsulating the data according to the protocol used by the serving device 103 to obtain a second data packet, and the data receiving device 101 sending the second data packet to the serving device 103.

Alternatively, the above-mentioned connection model further contains the information about the protocol adopted by the serving device 103 connected to an output port of the data receiving device 101. Therefore, before encapsulating the data according to the protocol used by the serving device 103, the data receiving device 101 further:

determines the protocol used by the serving device 103 according to the information about the protocol adopted by the serving device 103. Wherein, for the specific determination process in this step, see the process of determining the target protocol in step 202, and the process will not be described here.

It should be noted that the data receiving device 101 can use the above-mentioned method to determine the target protocol adopted by the IoT device 102 connected to each input port, and then decapsulates the data packet received through each input port according to the corresponding protocol to obtain the data sent by each IoT device 102.

With the data transmission method provided in the embodiments of the present invention adopted, after acquiring the information about the protocol adopted by the target IoT device connected to the target input port, the data receiving device determines the target protocol and decapsulates the first data packet sent by the target IoT device through the target input port according to the target protocol to obtain data. In the solution, the data receiving device can adaptively determine the target protocol according to the information about the target protocol adopted by the target IoT device, without configuring the target protocol for the target IoT device in advance. Therefore, the solution can improve the protocol application flexibility in the data receiving device, and thus can lower the complexity of the data receiving device maintaining a plurality of protocols.

Figure 3:
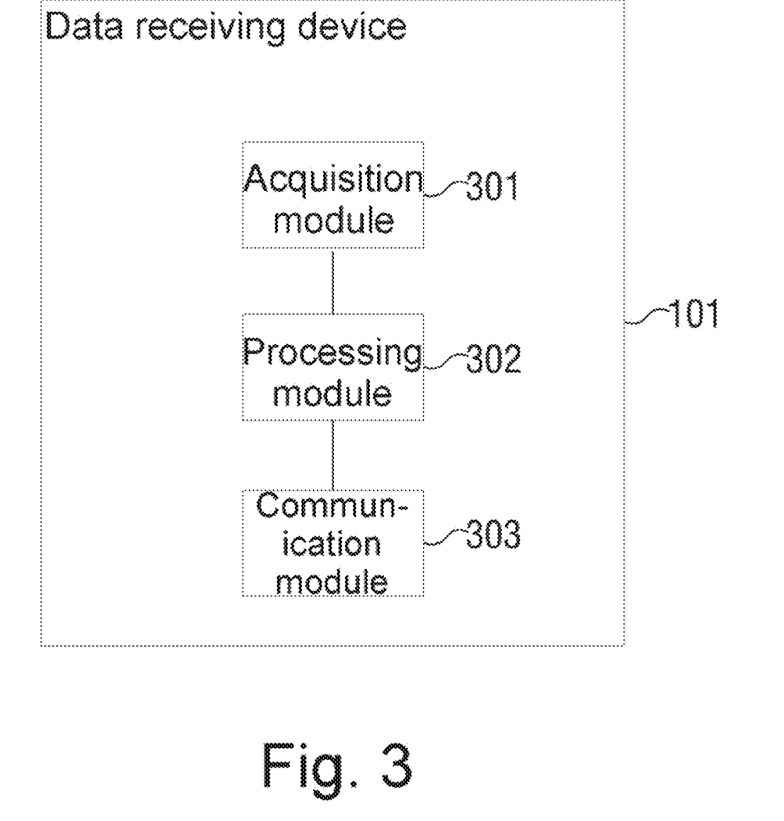
FIG. 3 shows the structure of one data receiving device provided in the embodiments of the present invention.

Based on the above-mentioned embodiment, the embodiments of the present invention further provide an optional implementation mode of the data receiving device involved in the embodiment of the above-mentioned method. As shown in FIG. 3, the data receiving device 101 may comprise an acquisition module 301, a processing module 302 and a communication module 303, wherein the data acquisition module 301 is used to acquire the information about the target protocol adopted by the target IoT device 102 connected to a target input port and the target input port is one input port of the data receiving device, the processing module 302 is used to determine the corresponding target protocol in a plurality of protocols according to the information acquired by the acquisition module 301 about the target protocol, the communication module 303 is used to receive a first data packet through the target input port and the first data packet is sent by the target IoT device 102, and the processing module 302 is further used to decapsulate the first data packet received by the communication module 303 according to the target protocol to obtain data.

Alternatively, the acquisition module 301 is particularly used to:

acquire a connection model, wherein the connection model contains the information about the protocol adopted by the IoT device 102 connected to each input port of the data receiving device, and acquire from the connection model the information about the target protocol adopted by the target IoT device 102 connected to the target input port.

Alternatively, when determining the corresponding target protocol in a plurality of protocols according to the information about the target protocol, the processing module 302 is particularly used to:

determine the target protocol model in the preset protocol models of the plurality of protocols according to the information about the target protocol, wherein the protocol model of any protocol is the template generating the protocol, and instantiate the target protocol model to obtain the target protocol.

Alternatively, the processing module 302 is further used to encapsulate data according to the protocol used by the serving device 103 to obtain a second data packet after obtaining the data, and the communication module 303 is further used to send the second data packet obtained by the processing module 302 to the serving device 103.

Alternatively, the target protocol is any of the following: TCP/IP, OPC protocol, OPCUA protocol, S7 protocol and Modbus protocol.

The embodiments of the present invention provide a data receiving device. After acquiring the information about the protocol adopted by the target IoT device connected to the target input port, the data receiving device determines the target protocol and decapsulates the first data packet sent by the target IoT device through the target input port according to the target protocol to obtain data. In the solution, the data receiving device can adaptively determine the target protocol according to the information about the target protocol adopted by the target IoT device, without configuring the target protocol for the target IoT device in advance. Therefore, the solution can improve the protocol application flexibility in the data receiving device, and thus can lower the complexity of the data receiving device maintaining a plurality of protocols.

It should be noted that the module division in the above-mentioned embodiment of the present invention is schematic and can be considered as a logical function division, and other division modes may be involved in the actual implementation. The modules in the embodiment of the present invention may be integrated into a processing module, or each module may exist independently, or two or more modules may be integrated into one module. The above-mentioned integrated module may be realized in the form of hardware or in the form of a software functional unit.

Figure 4:
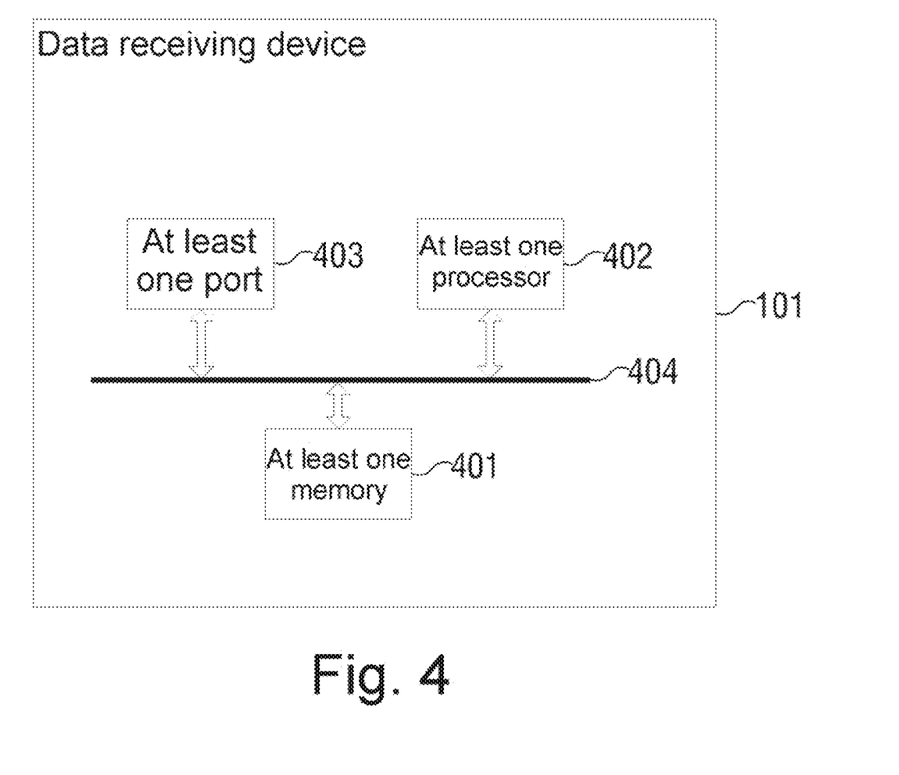
FIG. 4 shows the structure of another data receiving device provided in the embodiments of the present invention.

For another implementation mode of the data receiving device 101, see FIG. 4. The data receiving device 101 may comprise at least one memory 401, at least one processor 402 and at least one port 403.

The at least one memory 401, the at least one processor 402 and the at least one port 403 are interconnected through a bus 404, the bus 404 may be a peripheral component interconnect (PCI) bus or an extended industry standard architecture (EISA) bus. The bus 404 can be classified into an address bus, a data bus and a control bus. For the convenience of representation, only one thick line is used in FIG. 4, but it does not mean only one bus or only one type of bus.

The at least one port 403 is used to communicate and interact with other devices (for example, IoT device 102 and serving device 103) in the data transmission system. Wherein, the at least one port 403 may include an input port and an output port, the input port is used to receive a data packet sent by the IoT device 102, and the output port is used to send a data packet to the serving device 103.

The at least one processor 402 is used to realize the data transmission method shown in FIG. 2, including:

acquiring the information about the target protocol adopted by the target IoT device 102 connected to a target input port of the at least one port 403, wherein the target input port is one input port of the data receiving device, determining the corresponding target protocol in a plurality of protocols according to the information about the target protocol, and decapsulating the first data packet received through the target input port according to the target protocol to obtain data, wherein the first data packet is sent by the target IoT device 102.

Alternatively, when acquiring the information about the target protocol adopted by the IoT device 102 connected to the target input port, the at least one processor 402 is particularly used to:

acquire a connection model, wherein the connection model contains the information about the protocol adopted by the IoT device 102 connected to each input port of the data receiving device, and acquire from the connection model the information about the target protocol adopted by the target IoT device 102 connected to the target input port.

Alternatively, when the data receiving device determines the corresponding target protocol in a plurality of protocols according to the information about the target protocol, the at least one processor 402 is particularly used to:

determine the target protocol model in the preset protocol models of the plurality of protocols according to the information about the target protocol, wherein the protocol model of any protocol is the template generating the protocol, and instantiate the target protocol model to obtain the target protocol.

Alternatively, the at least one processor 402 is further used to:

encapsulate data according to the protocol used by the serving device 103 to obtain a second data packet after obtaining the data, and send the second data packet to the serving device 103 through the output port of the at least one port.

Alternatively, the at least one memory 401 is used to store a computer program. In particular, the program may include program codes and the program codes include computer-operated instructions. The at least one memory 401 may comprise at least one random access memory (RAM), or may comprise at least one non-volatile memory, for example, at least one disk. Wherein, at least one processor 402 invokes the computer program stored in at least one memory 401 to realize the above-mentioned function, thus realizing the data transmission method shown in FIG. 2.

The embodiments of the present invention provide a data receiving device. After acquiring the information about the protocol adopted by the target IoT device connected to the target input port, the data receiving device determines the target protocol and decapsulates the first data packet sent by the target IoT device through the target input port according to the target protocol to obtain data. In the solution, the data receiving device can adaptively determine the target protocol according to the information about the target protocol adopted by the target IoT device, without configuring the target protocol for the target IoT device in advance. Therefore, the solution can improve the protocol application flexibility in the data receiving device, and thus can lower the complexity of the data receiving device maintaining a plurality of protocols.

The embodiments of the present invention further provide a computer-readable medium and computer instructions which enable a machine to execute the data transmission method described in this document are stored in the computer-readable medium. In particular, a system or device equipped with the computer-readable medium can be provided, software program codes realizing the function in any of the above-mentioned embodiments are stored on the computer-readable medium, and the computer (or central processing unit (CPU) or micro processor unit (MPU)) of the system or device reads and executes the program codes stored in the storage medium.

In this case, program codes read from the storage medium themselves can realize the function in any of the above-mentioned embodiments. Therefore, program codes and the storage medium where program codes are stored constitute a part of the embodiments of the present invention.

Embodiments of the storage medium used to provide program codes include a floppy disk, hard disk, magneto-optical disk (for example, compact disk read-only memory (CD-ROM)), compact disk-recordable (CD-R), compact disk-rewritable (CD-RW), digital video disk-read only memory (DVD-ROM), digital versatile disk-random access memory (DVD-RAM), digital versatile disk±rewritable (DVD±RW), magnetic tape, non-volatile memory card, and read-only memory (ROM). Alternatively, the program codes can be downloaded from the server computer over a communication network.

In addition, it should clearly be understood that the function of any of the above-mentioned embodiments can be realized not only by executing the program codes read out by a computer, but also by letting the operating system running on the computer complete a part or all of practical operations through program code based instructions.

In addition, it should be understood that the program codes read out of a storage medium are written into the memory in the expansion board in a computer or are written into a memory in an expansion unit connected to the computer, and then the program code based instructions let the CPU installed on the expansion board or expansion unit execute a part or all of practical operations to realize the function of any of the above-mentioned embodiments.

It should be noted that not all steps or modules in the above-mentioned flowcharts and system structure diagrams are required, and some steps or modules can be omitted, depending on the actual requirements. The execution sequence of the steps is not fixed and can be adjusted as required. The system structures described in the above-mentioned embodiments can be physical structures or logical structures, that is to say, some modules may be realized by a physical entity, or some modules may be realized by at least two physical entities or may jointly be realized by some components in at least two self-contained devices.

In the above-mentioned embodiments, hardware units can mechanically or electrically be realized. For example, a hardware unit can comprise a permanent dedicated circuit or logic (for example, special processor, field programmable gate array (FPGA), or application specific integrated circuit (ASIC)) to complete the corresponding operations. A hardware unit can further comprise a programmable logic or circuit (for example, a general processor or other programmable processor) and can complete the corresponding operations through temporary software setting. The specific implementation mode (mechanical mode, or dedicated permanent circuit, or circuit which is temporarily set) can be determined on the basis of consideration of cost and time.

The present invention is disclosed and described in detail above in combination with the drawings and preferred embodiments. However, the embodiments of the present invention are not limited to these disclosed embodiments. On the basis of the above-mentioned embodiments, those skilled in the art can know that more embodiments of the present invention can be obtained by combining the code review means in the above-mentioned different embodiments, and all these embodiments should also fall within the scope of protection of the present invention.

The invention claimed is:

1. A data transmission method, comprising:
acquiring, via a data receiving device, information about a target protocol adopted by a target Internet of Things (IoT) device that is connected to a target input port, the target input port being one input port of the data receiving device;
determining, via the data receiving device, a corresponding target protocol from among a plurality of protocols, the determining according to the acquired information about the target protocol; and
after the determining the corresponding target protocol, decapsulating, via the data receiving device, a first data packet received through the target input port, the decapsulating decapsulates the first data packet according to the corresponding target protocol determined, to obtain data, the first data packet being sent by the target IoT device,
wherein the acquiring the information about the target protocol includes,
(1) acquiring a connection model via the data receiving device, wherein the connection model contains information about a protocol adopted by a respective IoT device connected to each input port of the data receiving device, and at least one of
    (a) the connection model stipulates a first correspondence between the each input port of the data receiving device and the information about the protocol adopted by the respective IoT device connected to the each input port, or
    (b) the connection model stipulates a second correspondence between the each input port of the data receiving device and device information about the respective IoT device connected to the each input port, and
(2) acquiring from the connection model, via the data receiving device, the information about the target protocol adopted by the target IoT device connected to the target input port.

2. A data receiving device comprising:
at least one memory;
at least one processor; and
at least one port, wherein,
the at least one memory is configured to store at least one computer program,
the at least one port is configured to send and receive data, and
the at least one processor is configured to execute the at least one computer program stored in the at least one memory and to execute a method of claim 1 upon execution of the at least one computer program, based on a function of the at least one port sending and receiving data.

3. The method of claim 1, wherein the determining of the corresponding target protocol in a plurality of protocols, according to the acquired information about the target protocol, includes:
    determining, via the data receiving device, a target protocol model in preset protocol models of the plurality of protocols, according to the acquired information about the target protocol, wherein a preset protocol model of each protocol is a template generating the protocol, and
    instantiating, via the data receiving device, the target protocol model determined, to obtain the target protocol.

4. The method of claim 3, wherein the corresponding target protocol is one of TCP/IP, OPC protocol, OPCUA protocol, S7 protocol and Modbus protocol.

5. The method of claim 1, wherein the corresponding target protocol is one of TCP/IP, OPC protocol, OPCUA protocol, S7 protocol and Modbus protocol.

6. The method of claim 1, wherein, after the data receiving device obtains the data, the method further comprises:
    encapsulating the data, via the data receiving device, according to a serving protocol used by a serving device, to obtain a second data packet, and
    sending the second data packet, via the data receiving device, to the serving device.

7. A non-transitory computer-readable medium, storing computer instructions executable by a processor to perform the method of claim 1 upon the computer instructions being executed by the processor.

8. A data receiving device, comprising:
    a data acquisition module, configured to acquire information about a target protocol adopted by a target Internet of Things (IoT) device that is connected to a target input port, the target input port being one input port of a data receiving device;
    a processing module, configured to determine a corresponding target protocol from among a plurality of protocols, the determining according to the acquired information about the target protocol; and
    a communication module, configured to receive a first data packet through the target input port, the first data packet being sent by the target IoT device, the processing module being further configured to decapsulate the first data packet received by the communication module after determining the corresponding target protocol, the processing module is configured to decapsulate the first data packet according to the corresponding target protocol, to obtain data,
    wherein the data acquisition module is configured to acquire information about the target protocol by,
    (1) acquiring a connection model, wherein the connection model contains information about a protocol adopted by a respective IoT device connected to each input port of the data receiving device, and at least one of
    (a) the connection model stipulates a first correspondence between the each input port of the data receiving device and the information about a protocol adopted by the IoT device connected to the each input port, or
    (b) the connection model stipulates a second correspondence between the each input port and device information about the IoT device connected to the each input port, and
    (2) acquiring from the connection model the information about the target protocol adopted by the target IoT device connected to the target input port.

9. The device of claim 8, wherein
    the processing module is further configured to:
    encapsulate data according to the protocol used by a serving device to obtain a second data packet, after obtaining the data, and
    the communication module is further configured to:
    send the second data packet obtained by the processing module to the serving device.

10. The device of claim 8, wherein the corresponding target protocol is one of:
    TCP/IP, OPC protocol, OPCUA protocol, S7 protocol and Mod bus protocol.

11. The device of claim 8, wherein, when determining the corresponding target protocol in a plurality of protocols according to the acquired information about the target protocol, the processing module is further configured to:
    determine a target protocol model in preset protocol models of the plurality of protocols according to the information about the target protocol acquired, wherein a preset protocol model of each protocol is a template generating the protocol, and
    instantiate the target protocol model to obtain the target protocol.

12. The device of claim 11, wherein the target protocol is one of:
    TCP/IP, OPC protocol, OPCUA protocol, S7 protocol and Mod bus protocol.

13. The device of claim 8, wherein, when determining the corresponding target protocol in a plurality of protocols according to the acquired information about the target protocol, the processing module is further configured to:
    determine a target protocol model in preset protocol models of the plurality of protocols according to the acquired information about the target protocol, wherein a preset protocol model of each protocol is a template generating the protocol, and
    instantiate the target protocol model to obtain the target protocol.

* * * * *

UNITED STATES PATENT AND TRADEMARK OFFICE
CERTIFICATE OF CORRECTION

| | | |
|---|---|---|
| PATENT NO. | : 11,343,317 B2 | Page 1 of 1 |
| APPLICATION NO. | : 16/615683 | |
| DATED | : May 24, 2022 | |
| INVENTOR(S) | : He Yu et al. | |

It is certified that error appears in the above-identified patent and that said Letters Patent is hereby corrected as shown below:

On the Title Page (71) Applicants should read: Siemens Aktiengesellschaft, Munich (DE)

Signed and Sealed this
Eleventh Day of October, 2022

Katherine Kelly Vidal
*Director of the United States Patent and Trademark Office*